United States Patent
Sanfilippo et al.

(10) Patent No.: US 7,404,942 B2
(45) Date of Patent: Jul. 29, 2008

(54) PROCESS FOR THE PRODUCTION OF HYDROGEN AND THE CO-PRODUCTION OF CARBON DIOXIDE

(75) Inventors: Domenico Sanfilippo, Milan (IT); Franco Mizia, Milan (IT); Alberto Malandrino, Milan (IT); Stefano Rossini, Milan (IT)

(73) Assignees: ENI S.p.A., Rome (IT); Enitecnologie S.p.A., San Donato Milanese (IT); Snamprogetti S.p.A., San Donato Milanese (IT)

( * ) Notice: Subject to any disclaimer, the term of this patent is extended or adjusted under 35 U.S.C. 154(b) by 0 days.

(21) Appl. No.: 11/754,672

(22) Filed: May 29, 2007

(65) Prior Publication Data
US 2007/0258878 A1    Nov. 8, 2007

Related U.S. Application Data

(63) Continuation of application No. 11/085,583, filed on Mar. 22, 2005, now abandoned.

(30) Foreign Application Priority Data

Mar. 23, 2004    (IT) .......................... MI2004A0555

(51) Int. Cl.
*C01B 31/20* (2006.01)
*C01B 3/10* (2006.01)
*C01B 3/24* (2006.01)

(52) U.S. Cl. .................... 423/437.1; 423/650; 423/657; 423/658

(58) Field of Classification Search ................. 423/650, 423/651, 652, 437.1, 657, 658
See application file for complete search history.

(56) References Cited

U.S. PATENT DOCUMENTS

| | | | |
|---|---|---|---|
| 3,442,620 A | 5/1969 | Huebler et al. |
| 5,641,470 A | 6/1997 | Blagev et al. |
| 6,509,000 B1 | 1/2003 | Choudhary et al. |
| 6,875,411 B2 | 4/2005 | Sanfilippo et al. |

FOREIGN PATENT DOCUMENTS

EP    1 134 187 A9    9/2001

*Primary Examiner*—Wayne A. Langel
(74) *Attorney, Agent, or Firm*—Oblon, Spivak, McClelland, Maier & Neustadt, P.C.

(57) ABSTRACT

Process for the production of hydrogen and the co-production of carbon dioxide in separate streams comprising the following operations: feeding of a solid to a first reaction zone (R1) in which a liquid or gaseous hydrocarbon, preferably natural gas or methane, is also fed, which reacts with the solid fed at its maximum oxidation degree (over-oxidized form), leading to the formation of the combustion products carbon dioxide and water and the solid at its minimum oxidation degree (reduced form); feeding of the solid in reduced form to a second reaction zone (R2) into which water is also fed, which reacts with the reduced form of the solid, producing hydrogen, steam and the solid at an intermediate oxidation degree (oxidized form); feeding of the solid in oxidized form to a third reaction zone (R3) into which air is also fed, obtaining, from the further oxidation of the solid, heat and the solid in over-oxidized form to be recycled to the first reaction zone (R1), wherein the solid contains at least one element selected from elements which, in addition to the metallic state, have at least three different oxidation states and are therefore capable of producing two redox pairs, in order of the oxidation state, characterized in that in the first reaction zone (R1) the solid in over-oxidized form and the liquid or gaseous hydrocarbon are fed in countercurrent.

15 Claims, 1 Drawing Sheet

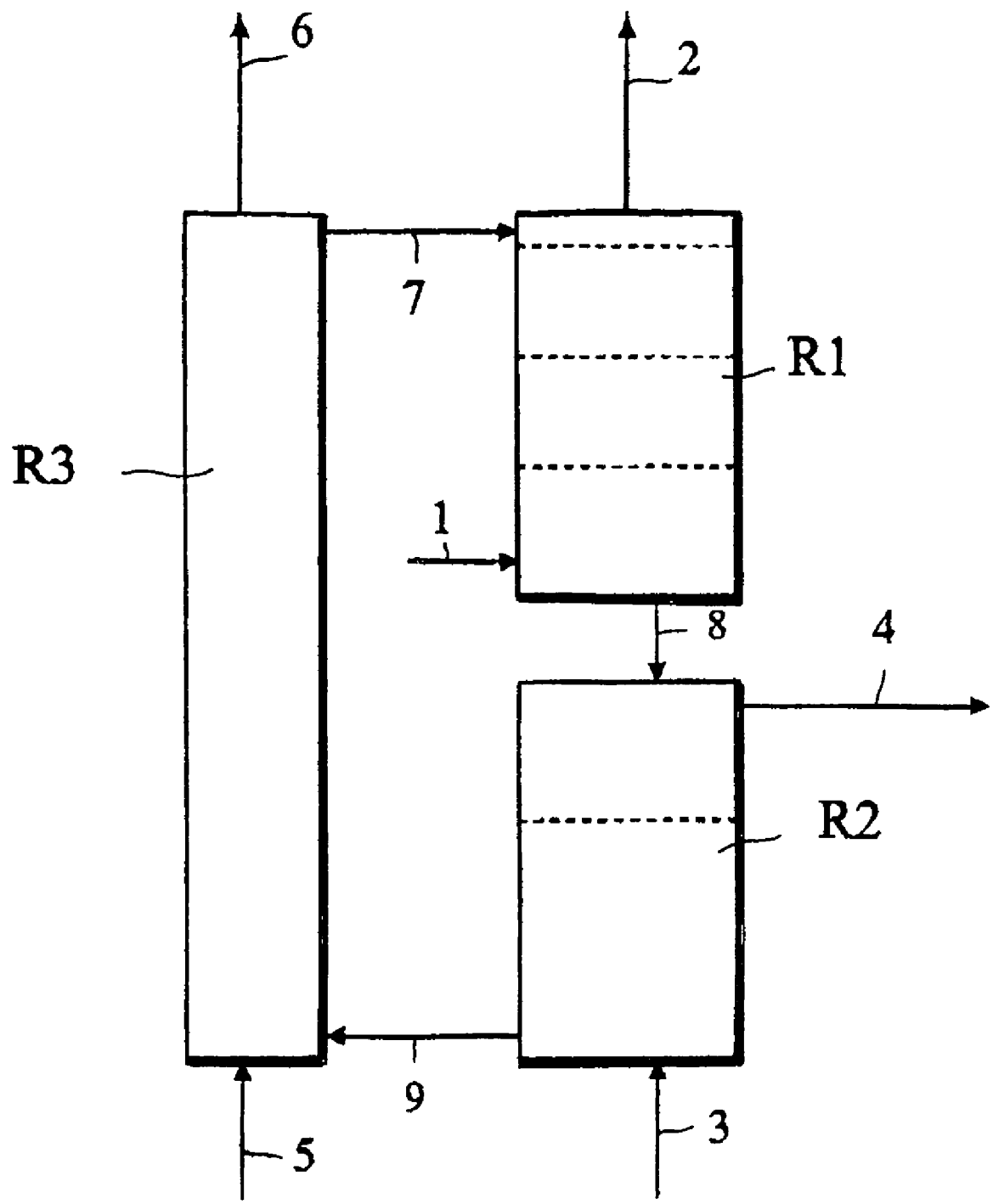

PROCESS FOR THE PRODUCTION OF HYDROGEN AND THE CO-PRODUCTION OF CARBON DIOXIDE

BACKGROUND OF THE INVENTION

Field of the Invention

The present invention relates to a process which uses natural gas or methane and water for the production of hydrogen and the co-production of carbon dioxide in separate streams.

The $H_2$ produced according to the invention can be used not only in all hydrogenation operations but also for feeding energy generators such as fuel cells, whereas the $CO_2$ co-produced can be eliminated where most convenient (exhausted well, sea bottom, etc.) to avoid its accumulation in the atmosphere.

DISCUSSION OF THE BACKGROUND

The known art describes processes and technologies for the production of synthesis gas $CO/H_2$ by the direct oxidation of natural gas using steam (steam reforming) or oxygen (partial oxidation) as oxidizing agent.

In the First Case (Steam Reforming)

$$CH_4 + H_2O = CO + 3H_2$$

the thermodynamic limits established by the formation of equilibrium, must be faced in the reaction area $$CO + H_2O \leftrightarrow CO_2 + H_2$$

In the Second Case (Partial Oxidation)

$$CH_4 + \tfrac{1}{2}O_2 = CO + 2H_2$$

problems of selectivity must be faced with respect to the total oxidation of the natural gas to $CO_2/H_2O$ which can only be overcome by operating within a temperature range (over 1000° C.), which, in addition to the necessity of a cryogenic air fractionation unit, makes the industrial technological application onerous.

In both cases, downstream of the natural gas conversion, the $CO/H_2$ mixture must still be treated with steam to increase the production of $H_2$ (low/high temperature WGS) followed by a first physical separation (PSA) of the hydrogen and subsequently, to obtain a high purity product, a further separation of the residual $CO_2$ by chemical absorption (washing with amines). Furthermore, in the case of steam reforming, a thermal support must be provided for the process as the reforming step and desorption from the amine of the carbonated $CO_2$ are of an endothermic nature.

In order to overcome problems relating to thermal support, autothermal reforming processes are being widely adopted, which envisage the feeding of the $CH_4/O_2$ mixture in a molar ratio (2:1) but operating within a temperature range which is such as to favour a total combustion reaction $$CH_4 + 2O_2 = CO_2 + 2H_2O$$

together with which the reforming of the excess methane with the $H_2O$ and $CO_2$ produced by the combustion, is effected contemporaneously.

In this way, the exothermy of total oxidation is balanced with the endothermy of steam reforming; in this case, with respect to partial combustion, there is no technological problem caused by the combustion temperature but a cryogenic air fractionation unit is still necessary.

The known art also describes processes and technologies for the production of $H_2/CO_2$ by the indirect steam reforming of natural gas; these are characterized by the formation of products in separate streams, thus not only avoiding all separation and purification operations of the products (HT/LT WGS; PSA; amines) but also overcoming all the thermodynamic limits established by the WGS reaction which runs consecutively with the direct reforming reaction discussed above.

In these processes, the reaction between $H_2O$ and natural gas is indirect as the oxygen exchange takes place through a solid capable of providing one or more intermediate redox pairs ($MeO/Me_xO_{(x+1)}$; $Me/MeO$) between the reducing potential of the $CH_4/CO_2$ pair and the oxidizing potential of the $H_2O/H_2$ pair. In practice, the redox solid acts as oxygen donor to the natural gas (reducing agent) and oxygen receiver from the water (oxidizing agent). The oxygen exchanged through the solid is chemically defined as "reversible oxygen" hereafter indicated as C.O.A. (chemical oxygen available) when it is released and as C.O.D. (chemical oxygen demand) when it is acquired by the solid.

U.S. Pat. No. 3,442,620 describes a process in which, in a first phase (endothermic) which leads to the production of the $CO_2/H_2O$ stream, the redox solid in its oxidized form, is completely or partially reduced to the metallic state by a reducing agent (in this case synthesis gas produced from coal and consequently there are two redox pairs in question ($CO/CO_2$ and $H_2/H_2O$).

The main reduction scheme is described by the following equations:

$$Me_xO_{(x+1)} + CO \leftrightarrow X\ MeO + CO_2 \qquad \text{a)}$$

$$Me_xO_{(x+1)} + H_2 \leftrightarrow X\ MeO + H_2O \qquad \text{b)}$$

$$MeO + CO \leftrightarrow Me + CO_2 \qquad \text{c)}$$

$$MeO + H_2 \leftrightarrow Me + H_2O \qquad \text{d)}$$

In a second process phase (exothermic) which leads to the production of the $H_2$ stream, the redox solid in its reduced form is oxidized by the $H_2O$ to the initial oxidation state according to the following equations:

$$Me + H_2O \leftrightarrow MeO + H_2 \qquad \text{e)}$$

$$XMeO + H_2O \leftrightarrow Me_xO_{(x+1)} + H_2 \qquad \text{f)}$$

wherein Me refers to Fe and X=3.

In the first process step, the solid oxygen carrier (oxidizing agent) in its most oxidized form ($Me_xO_{(x+1)}$ in down flow) and the reducing agent ($CO/H_2$ in up flow) are fed in countercurrent to each other in a sub-stoichiometric Ox/Red molar ratio with each other (reducing defect).

The reduction of the solid which is carried out with a step-wise mechanism, takes place in a two-zone reactor, a first upper zone where the formation of MeO (reactions a and b) is effected and a second lower zone where the further reduction to Me is effected (reactions c and d).

In the second process step, the solid oxygen receiver (reducing agent) obtained in the first step (Me/MeO mixture in down flow) and the oxidizing agent ($H_2O$ in up flow) are fed in countercurrent to each other in an over-stoichiometric Ox/Red molar ratio with each other (oxidizing excess) with the partial transformation of the oxidizing agent to $H_2$.

The oxidation of the solid is carried out in two zones, a first upper zone where the formation of MeO (reaction e) takes place and a second lower zone where the further oxidation of the solid is effected to its initial form (reaction f).

These process zones however cannot be considered in the light of subsequent process steps as each zone is characterized by a set of reactions at equilibrium.

In addition to these reactive steps, the process comprises a riser fed with an inert or poorly reactive gas such as the reduction spent-gas (a mixture of $CO_2/H_2O/CO/H_2$) which allows the solid obtained in the second step (simple pneumatic conveyance) to be re-fed to the first process step thus obtaining the continuous production of the two gaseous process streams described above.

All the process steps (a-f) are in equilibrium; consequently, as the process operates at "autogenous" conversion values (of equilibrium), once the pressure has been set within a range of 200-2500 psig, in order to close the process balance, a pair of temperatures must be selected (also on the basis of the composition of the reducing gas —$H_2/CO$ ratio) within a range of 1000° F.-2000° F. for carrying out the reduction step and oxidation step respectively.

As the process operates at a high solid/gas ratio and with a partial conversion of the reducing gas, as a consequence:
- the reduction off-gas does not consist of an intrinsically removable stream of $CO_2$
- the conversion per passage of exchangeable oxygen (redox yield) is rather low (values around 10-15%) which means a low yield/time-space to hydrogen.

In conclusion the chemical process yield is in the order of 65%.

Furthermore the problem of the closing of the thermal balance remains unsolved as the overall process is endothermic (the process reaction is $CO+H_2O \rightleftharpoons CO_2+H_2$).

Patent application EP-1134187 also proposes the indirect reaction between $H_2O$ and natural gas and describes a process and material wherein in a first step (endothermic) which leads to the production of the stream of $CO_2$ and $H_2O$, the redox solid in its oxidized form is reduced in counter-current by a reducing agent in upflow (in this case $CH_4$ and consequently there is the redox pair $CH_4/CO_2$).

The main reduction scheme is described by the following equation:

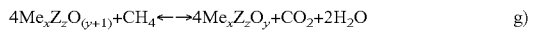

wherein $x \geq 1$; $y \geq 0$; $z \geq 0$ wherein Me represents the redox element which is preferably supported Fe wherein Z acts as promoter preferably selected from Ce, Cr, Zr.

More specifically, the reduction step of the material contemplates, with respect to the oxidizing agent, four parallel equilibriums (h; I; j; k), as follows:

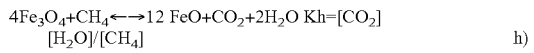

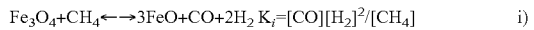

which, on the other hand, are of the competitive type with respect to the reducing species giving rise to possible problems of sub-conversion for the kinetically unfavourable species (rate determining steps).

To complete the conversion of the reducing agent, the technology proposed optionally envisages the introduction of an enrichment operation (TSA; PSA) of the reduction spent-gas in the reducing species ($H_2/CO$) and to subsequently re-feed it with further fresh redox solid (in a substantial excess) to an additional reduction zone. This however is onerous from an economical point of view.

In a second step of the process (exothermic) which leads to the production of the stream of $H_2$, the reduced redox solid is oxidized to the initial oxidation state in countercurrent with steam in upflow according to the following equation:

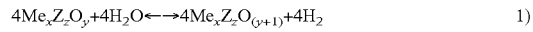

With respect to U.S. Pat. No. 3,442,620, a particular selection of the pair of reduction and oxidation temperatures for closing the molar balance, is not required as the reduction is effected at complete conversion (not a spontaneous equilibrium conversion) of the reversible oxygen and in the oxidation, the conversion of the steam can be considered as a freedom degree.

As the overall process is endothermic (the reaction is $2H_2O+CH_4 \rightarrow CO_2+4H_2$) the patent proposes the closing of the thermal balance by interposing, prior to the two redox steps, a thermal supporting riser (third step) in which heat is supplied to the process for:
- combustion of part of the hydrogen produced
- combustion of additional natural gas
- over-oxidation with air of the redox solid
- feeding an air combustor with reduction spent-gas containing $CO/H_2$ not before, however, effecting the $CO_2$ and $H_2O$ operation (PSA etc.)

In conclusion, the chemical process yield is around 83% (enthalpic efficiency close to 90%).

Although the technology described allows the objectives of said European patent application to be reached with extremely high chemical yield and enthalpic values, the problem remains however of the control/minimization (at the stoichiometric value) of the $MO/CH_4$ ratio, as may be required for the reduction reaction on various cascade zones and operating in excess of reversible oxygen whose direct consequence is a decrease in the space/time yield on the redox solid due to the low conversion of the oxidized form $Me_xZ_zO_{(y+1)}$ fed to the reduction step with methane (reaction g)).

Patent application IT-MI03A000192 describes the preparation of reactive systems consisting of an active phase based on Iron and a microspheroidal carrier based on microspheroidal alumina capable of providing a high redox yield (productivity to hydrogen in terms of $NltH_2/Kg$ of material) which are processed with a three-reaction-zone process comprising a first process phase in which water (oxidizing agent and solid (reducing agent) enter and $H_2$ is produced together with oxidized solid; a second process phase for heat supply in which air (oxidizing agent) and oxidized solid (reducing agent) enter and producing heat together with over-oxidized solid; a third process phase in which the over-oxidized solid (oxidizing agent) enters with natural gas (reducing agent) producing $CO_2/H_2O$ and reduced solid.

The high productive capacity of these materials can only be obtained, however, if these are processed with suitable reactor expedients both from a fluid-dynamic (promoting the fluidization of the reactive bed and therefore promoting the oxygen exchange between gas and solid) and chemical point of view, as the use of reactive systems based on iron oxides contemplates the presence of parallel equilibrium reactions (h; I; j; k) which, in the absence of expedients to shift the equilibriums towards the formation of products, cause a low process yield.

SUMMARY OF THE INVENTION

We have found an advantageous process which can be applied on an industrial scale and which allows the continuous production of separate streams of $H_2$ and $CO_2$ with a high purity, at the same time, maximizing the space and time yield, as there is no necessity of resorting either to separation or purification operations downstream.

The process, object of the present invention, for the production of hydrogen and the co-production of carbon dioxide comprises the following operations:

feeding of a solid to a first reaction zone (R1) in which a liquid or gaseous hydrocarbon is also fed, which reacts with said solid fed at its maximum oxidation degree (over-reduced form), leading to the formation of the combustion products carbon dioxide and water and the solid at its minimum oxidation degree (reduced form);

feeding of the solid in reduced form to a second reaction zone (R2) into which water is also fed, which reacts with said reduced form of the solid, producing hydrogen, steam and the solid at an intermediate oxidation degree (oxidized form);

feeding of the solid in oxidized form to a third reaction zone (R3) into which air is also fed, obtaining, from the further oxidation of the solid, heat and the solid in over-oxidized form to be recycled to the first reaction zone (R1), wherein said solid contains at least one element selected from elements which, in addition to the metallic state, have at least three different oxidation states and are therefore capable of producing at least two redox pairs, according to the oxidation state, characterized in that in the first reaction zone (R1) the solid in over-oxidized form and the liquid or gaseous hydrocarbon are fed in countercurrent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the sole figure shows an embodiment of the present invention.

DETAILED DESCRIPTION OF PREFERRED EMBODIMENTS

The hydrocarbon fed in the process according to the invention is preferably gaseous, more preferably natural gas or methane.

The redox reaction of the first reaction zone (R1) can be carried out in a step reactor, preferably at pressures ranging from 1 to 20 bar, at temperatures lower than or equal to 900° C., continuously feeding in countercurrent, over-oxidized solid (C.O.A)/natural gas or methane with a molar ratio less than or equal to 4/1.

The concept of a step reactor envisages the fact that a single reaction is effected on a series of successive chemical equilibrium steps at an increasing conversion degree.

The water and carbon dioxide can be removed from the top of the step reactor with a molar ratio $CO_2/H_2O$ equal to ½.

The redox reaction of the second reaction zone (R2) can be carried out in a step reactor, preferably operating at a pressure substantially equal to that of the step reactor of the first reaction zone, in which the reduced solid (C.O.D.) and the steam are fed countercurrent in continuous with a molar ratio less than or equal to 1.

The redox reaction of the third reaction zone (R3) can be carried out in a riser, feeding air and the oxidized solid in equicurrent.

The additional heat supply to the system can also be obtained by the combustion of natural gas or methane optionally co-fed with air into the third reaction zone (R3).

Solids which can be used are those containing at least one element selected from elements having at least three different oxidation states, stable under the reaction conditions, which differ in their oxygen content and in that they are capable of cyclically passing from the most reduced form to the most oxidized form and vice versa.

Solids containing one or more elements with the above characteristics can be used, i.e. having, in addition to the metallic state, at least three different oxidation states, preferably three states, and capable of producing in the order of oxidation state, at least two redox pairs, preferably 2 pairs, and can be adopted as such or in a mixture with other elements which are not subject to redox reactions; the reactive phase thus obtained can, in turn, be used as such or suitably dispersed or supported on compounds such as silica, alumina, or other pure oxides such as magnesium, calcium, cerium, zirconium, titanium, lanthanum, but also mixtures thereof.

Among solids having at least three different oxidation states, iron proves to be particularly advantageous, and can be present in the solid in binary form $Fe_xO_y$ 

And/or in ternary form $Fe_xZ_zO_y$ 

Wherein $x \geq 1$, $y \geq 0$, $z \geq 1$,

Z is at least an element selected from Ce, Zr, V and Mo.

In the third reaction zone (R3), the element selected from elements having at least three different oxidation states can optionally consist of two phases deriving from the fact that the oxidation step in R2 is carried out with a partial and incomplete conversion of the element: when the element is iron, the two phases are FeO and $Fe_3O_4$.

A preferred embodiment according to the invention can be obtained by a process configuration wherein the first phase that leads to the reduction of the redox solid (reaction (g)) is carried out in a step reactor which operates under suitable conditions of P (from 1 to 20 bar) and temperature (up to a maximum of 900° C. and depending however on the active phase used) to which natural gas or methane (reducing agent) are fed in continuous in upflow, and the reversible oxygen carrier $Me_xZ_zO_{(y+1)}$ (solid oxidizing agent) in downflow in a molar ratio (RED/OX) between each other that can be lower than or equal to that given by the stoichiometry of the reaction (g) (¼), and a stream of $CO_2/H_2O$ in a molar ratio equal to ½, is continuously removed, from above and, a stream of reduced solid $Me_xZ_zO_y$, from below.

In this way, the reduction reactions (h; I; j; k) of $Fe_3O_4$ with $CH_4$ which lead to the formation of the hydrogen precursor (FeO) are effected on a series of equilibrium steps at an increasing conversion degree (reduction) in downflow for the oxidizing solid and increasing parameters (oxidation) in upflow for the reducing gas.

From a chemical point of view, it is verified that in upflow, the reducing potential of the gas decreases due to the formation of the redox pairs $CO_2/CO$ and $H_2O/H_2$, but, as the pair $Fe_3O_4/FeO$ increases, the oxidizing potential of the solid, which actually supports the reaction (greater availability of oxygen which moves the equilibrium to the right), increases.

In order to provide thermal support to the process with the introduction of a third over-oxidation phase of the reactive system, in the upper part of the reactor (upflow), there is an additional and even more efficient redox pair $Fe_2O_3/Fe_3O_4$, capable of producing and sustaining the reaction even operating at high gas/solid ratios.

From a reactor point of view, the situation can be effected in a reactor of the plug-flow type which typically operates at a conversion profile which varies along the in/out axis of the reagent feeding and whose efficiency is linked to the minimization of back-mixing phenomena between solid and gas. In principle, a mobile bed reactor or fractionated (staged) fluid bed reactor can be used by the introduction of diaphragms (for example perforated plates or others), whose pressure drop (passage span) is studied to limit back-mixing phenomena and at the same time, allowing the upward movement of the gas and downward movement of the solid. The distance between one diaphragm and another (holdup of each step) is calculated on the basis of the kinetic characteristics of the reaction so as to obtain, for each step, an optimum distribution of the overall contact time. The minimum number of steps required is that fixed by the thermodynamics of the reactive system at the various reaction temperatures which are established in the reduction reactor and are determined by the thermal balance on said reactor.

The second phase of the process which leads to the oxidation of the redox solid (reaction (k)), is carried out in a multi-step reactor which operates at the same reactor pressure as the previous phase, and at a temperature selected on the basis of the thermodynamics and kinetics of the reaction (k) to which steam (oxidizing agent) is fed in continuous in upflow and the solid oxygen receiver $Me_xZ_zO_y$ (reducing agent) in downflow, in a molar ratio (RED/OX) which can be lower than or equal to, preferably lower than 1 (excess oxidizing agent), at the stoichiometry of the reaction (k), and a stream of $H_2$ and steam is removed in continuous from above, whereas a stream of $Me_xZ_zO^{(y+1)}$ is removed from below, which can be re-fed directly to the previous phase.

From the point of view of fluid-dynamics, this phase of the process can also be carried out in a fluid bed reactor which, according to the art, can be equipped with dividers whose function is to force the fluidization of the solid and thus improve the oxygen exchange between solid and gas (reduction in the diameter of the gas bubbles). There can be various types of dividers (for example, perforated plates; chevron) depending on the Theological characteristics of the gas and solid.

The third phase, where, in order to close the thermal balance of the process, the over-oxidation takes place of the active phase to $Fe_2O_3$ with air (exothermic), can be carried out by feeding gas and solid in equicurrent to a riser with the subsequent re-entry of this solid to the first phase of the process, preferably by pneumatic conveyance.

An embodiment of the present invention is provided below with the help of the figure, which should in no way be considered as limiting the scope of the invention itself.

With reference to the loop illustrated in figure, R1 represents the first process phase for the reduction of the solid and production of $CO_2$, R2 represents the second process phase for the oxidation of the solid and production of $H_2$, R3 represents the third process phase for the thermal support by over-oxidation of the solid.

The operating pressure of the loop is 20 ata.

Methane (1) is fed to the first phase of the process (R1), from which the combustion products $CO_2$ and $H_2O$ (2) are removed; steam (3) is fed to the second phase of the process (R2), from which the oxidation product $H_2$ (4) is removed; air (5) is fed to the third phase of the process (R3), from which impoverished air (6) is removed.

The scheme is completed by the circulation lines of the solid which connect the three process phases, the reduced solid (8) coming from the reduction phase (R1), is fed to the oxidation phase, the oxidized solid (9) coming from the oxidation phase (R2), is fed to the over-oxidation phase, the over-oxidized solid (7) coming from the heat production phase (R3), is fed to the reduction.

EXAMPLE 1

With reference to the scheme of the figure, the operating pressure of the loop is 20 ata, methane (1), steam (3) and air (5) are fed after preheating. The circulation flow-rate of the solid is in relation to the $Fe_2O_3/CH_4$ ratio necessary for completely converting the methane to $CO_2$ and water in the upper part of R1 (ratio depending on both the thermodynamics and contact time in R1) but at the same time it must be such as to guarantee the closing of the process thermal balance without resorting to excessively high $\Delta T$ values in the endothermic step (reduction) (Minimum temperature in R1 —lower part —not lower than 710° C) to avoid problems relating to kinetics and also excessively high $\Delta T$ values in the exothermic step (over-oxidation) (Maximum temperature in R3 —upper part—not exceeding 850° C). In accordance with this, redox solids are used, characterized in their thermal capacity values (Cp) and in their active phase ($Fe_2O_3$)/inert carrier ratio, capable therefore of releasing or acquiring (excluding the formation of metallic phases) a quantity of oxygen (O reversible) equal to a few weight percentage units (>1% w) with respect to the total of the carrier (active phase+ inert carrier).

From the point of view of chemical-performance, the productivity of this redox solid is equal to about 14 NLt of $H_2$ per Kg of solid processed per percentage of reversible oxygen acquired in the oxidation step with water (C.O.D.).

For R1, a multi-step reactor is used in countercurrent, in which the minimum number of steps (theoretical steps) is in relation to the positioning of the chemical equilibriums at the operating temperatures in which the stable reduced species is FeO, passing through the formation of the sub-stoichiometric oxide $Fe_{0.947}O$ (see following tables); for R2, on the other hand, a single equilibrium step has always been considered: in this reactor, in fact, by stopping the reduction of $Fe_3O_4$ in R1 at FeO, there is only the inverse reaction from FeO to $Fe_3O_4$ and there is therefore no advantage in using a multi-step reactor (there may be this advantage however from a fluid-dynamic point of view).

The air flow-rate to R3 is selected case by case on the basis of fluid-dynamic considerations to avoid having an excessively dense conveyance line.

TABLE 1

Reduction phase in R1 and production of $CO_2$ feeding 2379 kg/hr of REDOX solid and 22.4 Nmc/hr of methane (R 4.47:1)

| | Inlet gas line (1) | Step 1 | Step 2 | Step 3 | Step 4 line (4) | Solid inlet line (7) |
|---|---|---|---|---|---|---|
| T° C. | 450 | 724.7 | 783.4 | 839.0 | 853.7 | 848 |
| | | Flow rate kmoles/hour | | | | |
| $CH_4$ | 1 | 0.480 | 0.121 | 0.018 | 0.0 | |
| $CO_2$ | 0 | 0.268 | 0.487 | 0.582 | 1.0 | |
| $H_2O$ | 0 | 0.444 | 0.920 | 1.199 | 2.0 | |
| CO | 0 | 0.252 | 0.391 | 0.400 | 0.0 | |
| $H_2$ | 0 | 0.596 | 0.838 | 0.766 | 0.0 | |
| $Fe_2O_3$ | | 0 | 0 | 0 | 0.761 | 4.47 |
| $Fe_3O_4$ | | 0.47 | 1.444 | 2.710 | 2.472 | 0 |
| FeO | | 7.53 | 0 | 0 | 0 | 0 |
| $Fe_{0.947}O$ | | 0 | 4.867 | 0.854 | | |
| Inert carrier | | 11.708 | 11.708 | 11.708 | 11.708 | 11.708 |

TABLE II

Oxidation phase in R2 and production of $H_2$ by feeding 2314 kg/hr of REDOX solid reduced and 83.34 kg/hr of $H_2O$.

| | Inlet gas Line (3) | Step 1 Line (4) | Solid inlet Line (8) |
|---|---|---|---|
| T° C. | 400 | 734.8 | 707.6 |
| | Flow rate kmoles/hour | | |
| $H_2O$ | 4.63 | 2.12 | |
| $H_2$ | 0 | 2.51 | |
| $Fe_2O_3$ | | 0 | 0 |
| $Fe_3O_4$ | | 2.98 | 0.47 |
| FeO | | 0 | 7.53 |
| Inert carrier | | 11.708 | 11.708 |

TABLE III

Over-oxidation phase of the REDOX solid in R3 and production of heat by feeding 2354.9 kg/hr of oxidized REDOX solid and 136 Nmc/hr of air.

| | Inlet gas line (5) | Inlet solid line (9) | Out gas line (6) | Out solid line (7) |
|---|---|---|---|---|
| T° C. | 430 | 734.8 | 848 | 848 |
| | Flow rates kmoles/hour | | | |
| $N_2$ | 4.819 | | 4.819 | |
| $O_2$ | 1.281 | | 0.536 | |
| $Fe_2O_3$ | | 0 | | 4.47 |
| $Fe_3O_4$ | | 2.98 | | 0 |
| FeO | | 0 | | 0 |
| Inert carrier | | 11.708 | | 11.708 |

From the values of Tables I, II and III it can be observed that:

The methane conversion at the end of the reactive steps with $Fe_3O_4$ (steps 1÷3) is 98.2% whereas the selectivity to $CO_2$ and $H_2O$ is equal to 58%;

The methane conversion at the end of the reactive step with $Fe_2O_3$ (step 4) is 100% as also the selectivity to $CO_2$ is 100%;

The conversion of the water in R2 is 54.2%;

The oxygen released (C.O.A.) from the solid in R1 (Δp) is −2.7% (90% of the theoretical exchangeable oxygen value in the $Fe_2O_3$—FeO passage); that received (C.O.D.) from the solid in R2 (Δp) is +1.7% and that received in R3 (Δp) is, by difference, +1.0%;

2.51 Lt of $H_2$ are produced per litre of methane processed and consequently the thermal efficiency of the cycle, referring to $(QH_2 \times \Delta H_c H_2)/(QCH_4 \times \Delta H_c CH_4)$ is 75.65%;

23.63 NLt of $H_2$ are produced per Kg of solid processed and consequently the productivity of the solid is 84.4%

The discharge of the gases from the head of R1 (line 2) consists of a stream of which a third consists of $CO_2$ and two thirds of $H_2O$: after cooling and condensation, this stream forms a stream of pure $CO_2$;

The discharge of the gases from R2 (line 4) consists of an almost equimolar stream in steam and hydrogen: also in this case, after cooling and condensation, a stream is obtained which is practically pure in $H_2$.

The example shows that, when operating with a temperature of 853.7° C. in the upper part of R1, 4 equilibrium steps are sufficient. In order to completely convert the methane with a selectivity to $CO_2$ and $H_2O$ equal to 100%, it is necessary however to operate with respect to the stoichiometric value, in excess of $Fe_2O_3$ (4.47:1).

EXAMPLE 2

Reference is made to the scheme of FIG. 1 and with the same assumptions made in Example 1 except for the fact that in this case R3 represents a over-oxidation unit with air of the REDOX solid for the thermal support of the process, but, unlike the previous case methane is also fed as fuel (mixed thermal support).

TABLE IV

Reduction phase in R1 and production of $CO_2$ by feeding 2132 kg/hr of REDOX solid and 22.4 Nmc/hr of methane (R 4.0:1).

| | Inlet gas line (1) | Step 1 | Step 2 | Step 3 | Step 4 | Step 5 line (2) | Solid inlet line (7) |
|---|---|---|---|---|---|---|---|
| T° C. | 450 | 707.5 | 750.7 | 799.7 | 843.5 | 854.7 | 848 |
| | | | Flow rate kmoles/hour | | | | |
| $CH_4$ | 1 | 0.599 | 0.308 | 0.070 | 0.015 | 0 | |
| $CO_2$ | 0 | 0.203 | 0.364 | 0.527 | 0.587 | 1 | |
| $H_2O$ | 0 | 0.319 | 0.641 | 1.024 | 1.215 | 2 | |
| CO | 0 | 0.197 | 0.328 | 0.403 | 0.398 | 0 | |
| $H_2$ | 0 | 0.482 | 0.743 | 0.835 | 0.755 | 0 | |
| $Fe_2O_3$ | | 0 | 0 | 0 | 0 | 0.359 | 4 |
| $Fe_3O_4$ | | 0 | 0.572 | 1.500 | 2.444 | 2.427 | 0 |
| FeO | | 8 | 0 | 0 | 0 | 0 | 0 |
| $Fe_{0.947}O$ | | 0 | 6.637 | 3.696 | 0.705 | | |
| Inert carrier | | 10.477 | 10.477 | 10.477 | 10.477 | 10.477 | 10.477 |

TABLE V

Oxidation phase in R2 and production of $H_2$ by feeding 2110.9 kg/hr of reduced REDOX solid and 86.22 kg/hr of $H_2O$.

| | Inlet gas Line (3) | Step 1 Line (4) | Solid inlet Line (8) |
|---|---|---|---|
| T° C. | 400 | 734.0 | 707.5 |
| | | Flow rate kmoles/hour | |
| $H_2O$ | 4.79 | 2.123 | |
| $H_2$ | 0 | 2.667 | |
| $Fe_2O_3$ | | 0 | 0 |
| $Fe_3O_4$ | | 2.667 | 0 |
| FeO | | 0 | 8 |
| Inert carrier | | 10.477 | 10.477 |

TABLE VI

Over-oxidation phase of REDOX solid in R3 and production of heat by feeding 2354.9 kg/hr of oxidized REDOX solid and 121.85 Nmc/hr of air and 0.87 Nmc/hr of methane.

| | Inlet gas line (5) | Fuel line (5) | Solid inlet line (9) | Out gas line (6) | Out solid line (7) |
|---|---|---|---|---|---|
| T° C. | 430 | 450 | 734 | 848 | 848 |
| | | | Flow rate kmoles/hour | | |
| $N_2$ | 4.298 | | | 4.298 | |
| $O_2$ | 1.142 | | | 0.398 | |
| $CH_4$ | | 0.039 | | 0 | |
| $CO_2$ | | | | 0.039 | |
| $H_2O$ | | | | 0.078 | |
| $Fe_2O_3$ | | | 0 | | 4 |
| $Fe_3O_4$ | | | 2667 | | 0 |
| FeO | | | 0 | | 0 |
| Inert carrier | | | 10.477 | | 10.477 |

From the values of Tables IV, V and VI it can be observed that:

The methane conversion at the end of the reactive steps with $Fe_3O_4$ (steps 1÷4) is 100% whereas the selectivity to $CO_2$ and $H_2O$ is equal to 58%;

The methane conversion at the end of the reactive step with $Fe_2O_3$ (step 5) is 100% as also the selectivity to $CO_2$ is 100%;

The conversion of the water in R2 is 55.7%;

The oxygen released (C.O.A.) from the solid in R1 (Δp) is −3.0% (100% of the theoretical exchangeable oxygen value in the $Fe_2O_3$—FeO passage); that received (C.O.D.) from the solid in R1 (Δp) is +2.0% and that received in R3 (Δp) is, by difference, +1.0%;

2.56 Lt of $H_2$ are produced per litre of methane processed and consequently the thermal efficiency of the cycle, referring to $(QH_2 \times \Delta H_C H_2)/(QCH_4 \times \Delta H_C CH_4)$ is 76.51%;

28.1 NLt of $H_2$ are produced per Kg of solid processed and consequently the productivity of the solid is 100%

The discharge of the gases from the head of R1 consists of a stream of which a third consists of $CO_2$ and two thirds of $H_2O$: after cooling and condensation, this stream forms a stream of pure $CO_2$;

The stream at the outlet of R1 also contains $CO_2$ and water, due to the combustion of the $CH_4$ in R3: the separation of CO, is consequently not total but is 96.3%;

The discharge of the gases from R2 (line 4) consists of an almost equimolar stream in steam and hydrogen: also in this case, after cooling and condensation, a stream is obtained which is practically pure in $H_2$.

This example shows that it is possible, with a temperature of 854.7° C. in the upper part of R1, to completely convert the methane with a selectivity to $CO_2$ and $H_2O$ equal to 100% and at the same time to obtain the maximum productivity in $H_2$ of the solid, by feeding $Fe_2O_3$ at a stoichiometric value with methane (4:1).

To obtain this, it is necessary to co-feed a quota of methane to the thermal support unit which envisages the presence of $CO_2$ (0.8%) in the fumes from R3.

Five equilibrium steps are necessary for this case (in practice the introduction of an additional step with respect to the previous case limits the excess of $Fe_2O_3$, from the point of view of the methane, the $H_2/CH_4$ productivity proves to paradoxically improve even if a quota is fed to R3).

EXAMPLE 3

Reference is made to the scheme of FIG. 1 and with the same assumptions made in Example 1 except for the fact that in this case R3 represents a over-oxidation unit for thermal support with air of the REDOX solid which consists of two phases (FeO and $Fe_3O_4$) deriving from the fact that the oxidation step is carried out in R2 with a partial and incomplete conversion of the FeO.

TABLE VII

Reduction phase in R1 and production of $CO_2$ by feeding 2132 kg/hr of solid REDOX and 22.4 Nmc/hr of methane (R 4.0:1).

|  | Inlet gas line (1) | Step 1 | Step 2 | Step 3 | Step 4 | Step 5 line (2) | Solid inlet line (7) |
|---|---|---|---|---|---|---|---|
| T° C. | 450 | 707.6 | 751.7 | 802.9 | 847 | 856.8 | 850 |
|  |  | Flow rate kmoles/hour | | | | | |
| $CH_4$ | 1 | 0.604 | 0.301 | 0.063 | 0.013 | 0 | |
| $CO_2$ | 0 | 0.197 | 0.368 | 0.534 | 0.590 | 1 | |
| $H_2O$ | 0 | 0.309 | 0.650 | 1.043 | 1.226 | 2 | |
| CO | 0 | 0.199 | 0.331 | 0.404 | 0.397 | 0 | |
| $H_2$ | 0 | 0.483 | 0.748 | 0.832 | 0.747 | 0 | |
| $Fe_2O_3$ | | 0 | 0 | 0 | 0 | 0.407 | 4 |
| $Fe_3O_4$ | | 0 | 0.546 | 1.526 | 2.483 | 2.396 | 0 |
| FeO | | 8 | 0 | 0 | 0 | 0 | 0 |
| $Fe_{0.947}O$ | | 0 | 6.719 | 3.614 | 0.583 | 0 | 0 |
| Inert carrier | | 10.477 | 10.477 | 10.477 | 10.477 | 10.477 | 10.477 |

TABLE VIII

Oxidation phase in R2 and production of $H_2$ by feeding 2110.9 kg/hr of reduced REDOX solid and 83.08 kg/hr of $H_2O$.

|  | Inlet gas Line (3) | Step 1 Line (4) | Solid inlet Line (8) |
|---|---|---|---|
| T° C. | 400 | 734.8 | 707.6 |
|  | Flow rate kmoles/hour | | |
| $H_2O$ | 4.565 | 2.013 | |
| $H_2$ | 0 | 2.552 | |
| $Fe_2O_3$ | | 0 | 0 |
| $Fe_3O_4$ | | 2.552 | 0 |
| FeO | | 0.343 | 8 |
| $Fe_{0.974}O$ | | 0 | 0 |
| Inert carrier | | 10.477 | 10.477 |

TABLE IX

Over-oxidation phase of the REDOX solid in R3 and production of heat by feeding 2354.9 kg/hr of oxidized solid REDOX and 123.6 Nmc/hr of air.

|  | Inlet gas line (5) | Inlet solid line (9) | Out gas line (6) | Out solid line (7) |
|---|---|---|---|---|
| T° C. | 430 | 743.2 | 850 | 850 |
|  | Flow rates kmoles/hour | | | |
| $N_2$ | 4.361 | | 4.361 | |
| $O_2$ | 1.159 | | 0.435 | |
| $Fe_2O_3$ | | 0 | | 4 |
| $Fe_3O_4$ | | 2.550 | | 0 |
| FeO | | 0.351 | | 0 |
| $Fe_{0.974}O$ | | 0 | | 0 |
| Inert carrier | | 10.477 | | 10.477 |

From the values of Tables VII, VIII and IX, it can be observed that:

The methane conversion at the end of the reactive steps with $Fe_3O_4$ (steps 1÷4) is 100% whereas the selectivity to $CO_2$ and $H_2O$ is equal to 58%;

The methane conversion at the end of the reactive step with $Fe_2O_3$ (step 5) is 100% as the selectivity to $CO_2$ is also 100%;

The conversion of the water in R2 is 55.9%;

The oxygen released (C.O.A.) from the solid in R1 (Δp) is −3.0% (100% of the theoretical exchangeable oxygen value in the $Fe_2O_3$—FeO passage); that received (C.O.D.) from the solid in R2 (Δp) is +1.9% and that received in R3 (Δp) is, by difference, +1.1%;

2.55 Lt of $H_2$ are produced per litre of methane processed and consequently the thermal efficiency of the cycle, referring to $(QH_2 \times \Delta H_C H_2)/(QCH_4 \times \Delta H_C CH_4)$ is 76.93%;

26.9 NLt of $H_2$ are produced per Kg of solid processed and consequently the productivity of the solid is 95.7%

The discharge of the gases from the head of R1 consists of a stream of which a third consists of $CO_2$ and two thirds of $H_2O$: after cooling and condensation, this stream forms a stream of pure $CO_2$;

There is the total separation of $CO_2$;

The discharge of the gases from R2 consists of an almost equimolar stream in steam and hydrogen: also in this case, after cooling and condensation, a stream is obtained which is practically pure in $H_2$.

This example shows that it is possible to completely convert the methane with a selectivity to $CO_2$ and $H_2O$ equal to 100% by feeding $Fe_2O_3$ (C.O.A.) in a stoichiometric ratio with methane (4:1).

In order to obtain this, the maximum production of $H_2$ in R2 must be renounced and consequently not only $Fe_3O_4$ but also residual FeO will enter R3. This will allow the total thermal balance to be closed without the necessity of thermal support.

Also in this case, the minimum number of equilibrium steps necessary proved to be equal to 5.

The invention claimed is:

1. A process for the production of hydrogen and the co-production of carbon dioxide comprising the following operations:

feeding of a solid to a first reaction zone (R1) in which a liquid or gaseous hydrocarbon is also fed, which reacts with said solid fed at its maximum oxidation degree (over-oxidized form), leading to the formation of the combustion products carbon dioxide and water and the solid at its minimum oxidation degree (reduced form);

feeding of the solid in reduced form to a second reaction zone (R2) into which water is also fed, which reacts with said reduced form of the solid, producing hydrogen, steam and the solid at an intermediate oxidation degree (oxidized form);

feeding of the solid in oxidized form to a third reaction zone (R3) into which air is also fed, obtaining, from the further oxidation of the solid, heat and the solid in over-oxidized form to be recycled to the first reaction zone (R1), wherein said solid contains at least one element selected from the group consisting of elements which, in addition to the metallic state, have at least three different oxidation states and are therefore capable of producing at least two redox pairs, in order to the oxidation state, characterized in that in the first reaction zone (R1) the solid in over-oxidized form and the liquid or gaseous hydrocarbon are fed in countercurrent.

2. The process according to claim 1, wherein the hydrocarbon is gaseous.

3. The process according to claim 2, wherein the gaseous hydrocarbon is methane or natural gas.

4. The process according to claim 1, wherein the redox reaction of the first reaction zone is effected in a step reactor.

5. The process according to claim 4, wherein the redox reaction is effected at pressures ranging from 1 to 20 bar and at temperatures lower than or equal to 900° C., by feeding in continuous with a over-oxidized solid/natural gas molar ratio lower than or equal to ¼.

6. The process according to any one of claims 4 and 5, wherein the water and carbon dioxide are removed from the top of the step reactor with a molar ratio $CO_2/H_2O$ equal to ½.

7. The process according to claim 1, wherein the redox reaction of the second reaction zone is carried out in a step reactor.

8. The process according to claim 7, wherein the step reactor of the second reaction zone operates at a pressure which is substantially equal to that of the step reactor of the first reaction zone in which the steam and reduced solid are fed countercurrent in continuous with a molar ratio lower than or equal to 1.

9. The process according to claim 1, wherein the redox reaction of the third reaction zone (R3) is effected in a riser by feeding air and the oxidized solid in equicurrent.

10. The process according to claim 1, wherein the element contained in the solid is iron.

11. The process according to claim 10, wherein the iron is present in the solid in binary form $Fe_xO_y$ and/or in ternary form $Fe_xZ_zO_y$, wherein $x \geq 1$, $y \geq 0$, $z \geq 1$ and Z is at least one element selected from the group consisting of Ce, Zr, V and Mo.

12. The process according to claim 1, wherein, in the third reaction zone (R3), natural gas or methane is also fed, obtaining the supply of further heat by combustion.

13. The process according to claim 1, wherein the element contained in the solid is selected from the group consisting of elements having, in addition to the metallic state, three different oxidation states and capable of producing two redox pairs in the order of the oxidation state.

14. The process according to claim 1, wherein, in the third reaction zone (R3), the solid consists of two phases.

15. The process according to claim 10, wherein the iron contained in the solid consists of two phases FeO and $Fe_2O_3$.

* * * * *